United States Patent Office 3,385,390
Patented May 28, 1968

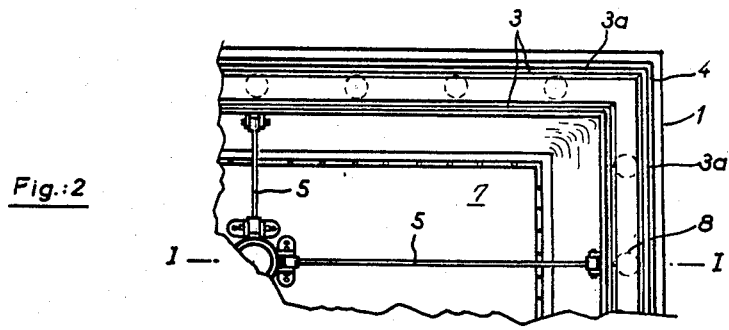
Fig.: 2
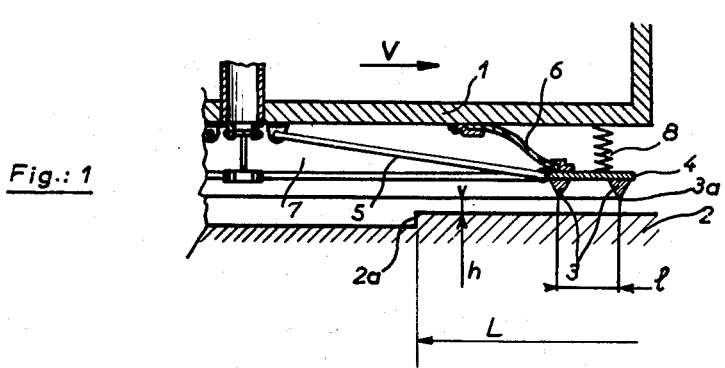
Fig.: 1
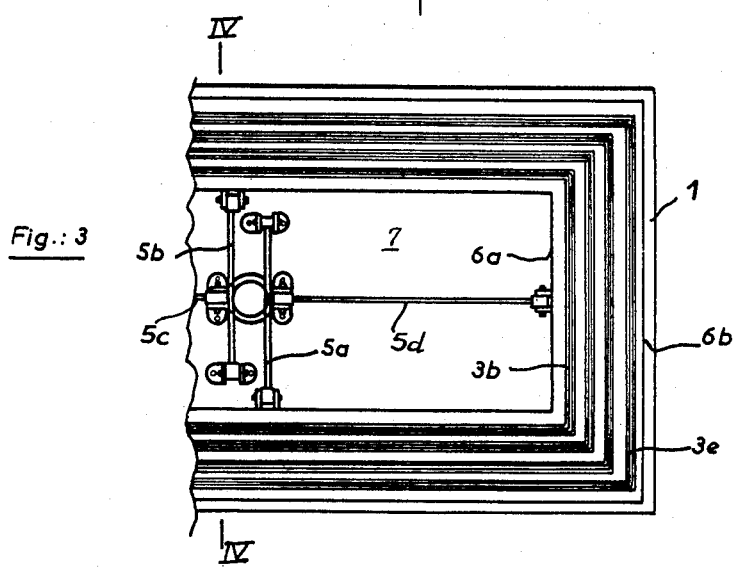
Fig.: 3

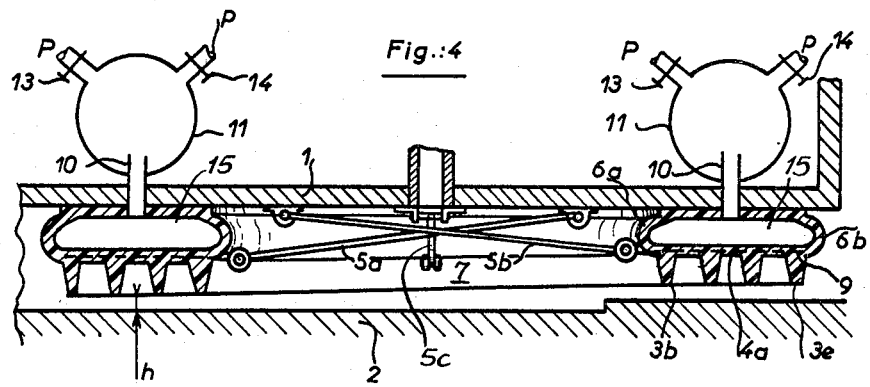
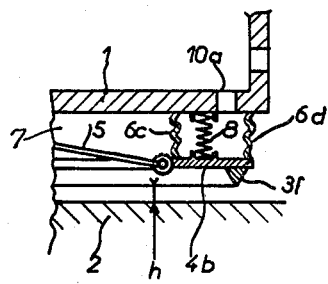
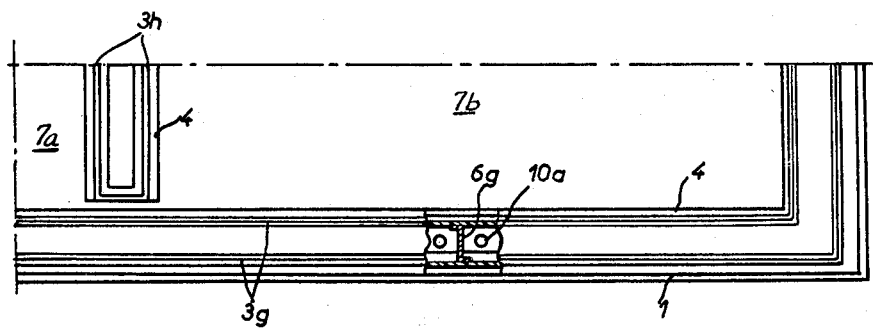

3,385,390
PRESSURE FLUID CUSHION SEALING SYSTEM FOR TRACKED GROUND EFFECT MACHINES
Paul François Guienne, Paris, France, assignor to Societe Bertin & Cie, Paris, France, a company of France
Filed Jan. 15, 1965, Ser. No. 425,871
Claims priority, application France, Jan. 21, 1964, 961,061
15 Claims. (Cl. 180—116)

ABSTRACT OF THE DISCLOSURE

A tracked ground effect machine equipped with a cushion sealing system embodying one or more lips protruding from a base plate extending parallel to the track surface and movable with respect to the main body of the machine toward and away from said surface. The plate-and-lip assembly is fluid tightly and flexibly connected to said body by a membrane which laterally bounds the cushion and this assembly is fitted to said body through a support structure which comprises: linking guide means allowing free movement of said assembly relatively to said body, perpendicularly to said surface while restraining relative movement parallel thereto, and resilient return means urging said assembly toward said surface.

---

This invention relates in a general manner to ground effect machines movable along a track made of concrete or metal for instance, and for which both the suspension and the guidance means are fluid cushions arranged opposite substantially flat surfaces of said track.

In contrast to air cushion type vehicles designed to travel over unprepared terrain and to cross obstacles thereon, which require above all a large ground clearance and highly yieldable air retaining means such as a flexible or gaseous curtain, air cushion vehicles which cooperate with a track chiefly require a seal ensuring small air losses, the flexibility of which is only of secondary importance. In this respect, the labyrinth seal described in the U.S. Patent No. 3,190,235, filed June 17, 1963 is particularly well-suited since it does not require an auxiliary compressed gas supply.

It is the principal object of the present invention to provide improved seals for air cushion vehicles or like ground effect machines operating on a track, which, in addition to having a low leakage rate, afford the possibility of movement perpendicularly to the track and to the vehicle, whereby to spontaneously and instantly follow the surface of said track and maintain practically constant the leakage gap of a cushion, notwithstanding the fact that the vehicle itself may have its ground clearance vary locally (due for instance to a curvature in the track surface).

A seal according to the invention accordingly consists in the combination of a base plate whose mean position is parallel with the track bearing surface and which may bear at least one lip, with at least one flexible diaphragm and guiding means connecting said base plate to the vehicle body while enabling it to move substantially perpendicularly to the surface of the track with which the seal cooperates, elastic return means being additionally interposed between said base plate and said vehicle body to counterbalance the pressure prevailing in the leakage gap between the seal base and the track surface.

In a preferred embodiment, the base plate is guided in its movements by link means substantially parallel with the track surface and having their ends pivotally connected to said base plate and to an external wall of the vehicle body, respectively. The seal base, which normally tends to recede from the track surface, is urged toward the latter by springs preferably having great flexibility.

The seal may be connected to the external wall of the vehicle through the agency of two flexible walls between which a compressed elastic fluid is delivered. The internal capacity of the closed seal devised in this manner is preferably large so that the vertical flexibility of the elastic mattress enclosed by the seal be in turn high. To this end the mattress may be placed in communication with an auxiliary chamber through calibrated orifices adapted to accessorily render the movement of the seal aperiodic.

The seal lip may be made of plastic material whereby to revert to its shape after accidental encounter with an exceptional obstacle, an example of such a material being polyvinyl chloride which has good resistance to abrasion. The base plate is preferably formed in one piece, thereby resulting in an anticipated movement of the rear part of the seal when the front part has passed over a surface bump in the track or change in level.

In the drawings,

FIGURE 1 shows in schematic cross-section a cushion equipped with a seal according to the invention;

FIGURE 2 is a corresponding underneath view, showing one quarter of a cushion;

FIGURES 3 and 4 show on an enlarged scale a first alternative embodiment, as seen from below and in cross-section respectively;

FIGURE 5 is a cross-sectional view of a seal with a single lip; and

FIGURE 6 is an underneath view in fragmental section showing several different ways of partitioning a cushion and a seal.

Referring first to FIGURES 1 and 2, numeral 1 denotes an outer wall of the main body of a ground effect machine such as an air cushion vehicle operating on a track 2 and equipped with labyrinth seals 3. The wall 1 may be either the bottom or a side of the vehicle.

The seal comprises a plurality of lips having a thin edge as at 3a, and these lips are dependent from a base plate 4 which is adapted to be movable substantially normally to the surface of the track 2 and is guided to that end by a plurality of links or cables 5 which are respectively pivotally connected to the wall 1 and to the various parts of the base plate, which is substantially frame-like in shape. Between the wall and the base plate are additionally disposed a flexible fluidtight membrane 6 stretched by the internal pressure of the air cushion 7 and resilient returns means for countering the pressure between the base plate and the track. These elastic means may merely consist of a set of springs 8.

In an alternative constructional form shown in FIGURES 3 and 4, a base plate 4a, lips 3b, c . . . e forming the labyrinth proper jointly with the track surface, and flexible membrane 6a–6b for restraining the cushion air, are all part of a unitary composite seal. The latter, which may be made of rubber for instance, is provided with a reinforcement 9 imparting a degree of rigidity to the base plate 4a and is generally tubular shaped with two flexible lateral walls 6a, 6b. It may be closed at its upper part secured to the vehicle body wall 1.

The interior of this composite seal is preferably connected, through passages 10 of calibrated cross-section, to at least one auxiliary chamber 11. The volume of this chamber may be so chosen that, having regard for the cross-section of passage 10 and the volume of the seal, the motion of the base plate relative to the vehicle is aperiodic. The seals may alternatively be placed in communication, through valves 13 and 14, with two convenient spaces wherein the pressures P and p are respectively greater and less than the pressure prevailing inside the seal (which pressure may be adjusted by means of said valves as a function of the total weight of the vehicle).

The chamber 11 could, in yet another alternative constructional form, comprise only one valve such as 13 or 14, used to periodically adjust the internal seal pressure.

Referring still to the alternative embodiment of FIGURES 3 and 4, the links or cables 5a and 5b, shown in the figures to be pivotally connected to the reinforcement 9 of the close-set sides of the composite seal, may be crossed in order to as the other links or cables 5c and 5d which lead to the remote sides of the seal have approximately the same length. The corners of the seal, as seen in plan view, are preferably obtained by welding or bonding.

The manner of operation of the subject seal of this invention is based on the principle of stable equilibrium, about a certain position of the seal lips relative to the track surface and corresponding to the normal leakage gap, between, on the one hand, the resilient forces urging the seal toward the track and, on the other, the pressure forces exerted by the escaping gas against that surface of the base plate which faces the track.

Any accidental reduction in the local leakage gap beneath a seal immediately causes the pressure inside the respective air cushion 7 to increase, thereby increasing the pressure exerted against the base surface facing the track (which pressure is intermediate between the internal cushion pressure and the ambient pressure). The pressure forces therefore temporarily dominate the elastic return forces, it being immaterial whether the latter are produced by springs or a compressed gas as at 15 inside a hollow and deformable tube. Conversely, an accidental increase in the local leakage gap beneath a seal will cause the elastic return forces to become temporarily dominant. In either case, however, the seal tends to revert to its normal position relative to the track, and the smaller its inertia, the quicker this movement will be which is incidentally independent of the motion of the vehicle as a whole, or, more precisely, of the vehicle portion above the cushion in question.

A protrusion in the track surface, as shown at 2a in FIGURE 1, reduces the leakage gap plate $h$ by producing a pressure increment $p$ on the base $\Delta$ plate. A simple calculation based on the preceding considerations will reveal the minimum length L which the protrusion must have for a seal of width $l$ to be lifted, under these conditions, through $h/2$. The vehicle is assumed to be travelling at a velocity V, the seal to have a weight $\varpi$ per unit area and the pressure developed by the base in the normal position responsively to the elastic means to be $\varpi'$. This gives:

$$L = 1 + V \sqrt{\frac{(\varpi + \varpi')h}{g \Delta p}}$$

For $h=1$ cm. and $V=40$ m./sec.

(a) in the case of a seal according to the invention, the numerical data can be taken as:

$l = 0.2m$.

$\varpi + \varpi' = 25$ kg./m.$^2$

It will be assumed that the pressure inside the cushion 7 is normally 500 kg./m.$^2$ and that it was momentarily doubled due to the reduction in the leakage gap. Since the pressure beneath the seal is the mean between the cushion pressure and atmospheric pressure, we have:

$\Delta p = \frac{1}{2} \times 500$ kg./m.$^2 = 250$ kg./m.$^2$ giving $L = 0.60m$ (b) in the case of an elemental air cushion equipped with a seal of the same type (but fixed in this case), a similar calculation is valid provided the following substitutions are made:

$l$ to be replaced by the total cushion length, e.g. $2m$,
$\Delta p$ by the pressure increase in the cushion, $\Delta p = \frac{1}{2} \times 1000$ kg./m.$^2 = 500$ kg./m.$^2$ $\varpi + \varpi' = 500$ kg./m.$^2$ is in this case the vehicle reaction balancing the lift pressure.

The reduction in the leakage gap is assumed to be the same as in the previous example utilizing a seal according to the invention.

This gives $L' = 3.2$ $m \cong 5L$, which clearly shows the markedly response time of the improved seal described precedingly.

It will immediately be apparent from this comparison that a cushion equipped with a balanced seal according to the invention experience reduced wear on the seal lips (due to accidental momentary friction against the track) as well as a more constant leakage flow. Furthermore, such a cushion can behave as a new type of suspension element, i.e. as an extremely simple servo-mechanism in which the complete seal itself constitutes the detector or feeler while the air cushion and its supply system (not shown) constitute the power stage.

FIGURE 5 shows in cross-section yet another alternative embodiment of the seal with a single lip 3f, made for instance of polyvinyl chloride, which, in addition to its plasticity, has a low friction coefficient and great resistance to abrasion. The base plate 4b is connected to the vehicle body wall 1 through two bellows-shaped diaphragms 6c, 6d. The space within the seal, which communicates with the surrounding atmosphere through at least one passage 10a, serves as a damping means while the springs 8 constitute the only static elastic return device.

Reference is lastly had to FIGURE 6 for an illustration of certain constructional details of seals according to the present invention, as viewed from underneath. On its left side, FIGURE 6 shows a peripheral seal 3g common to two contiguous cushions 7a, 7b separated by a partition 3h independent of this seal, this being possible because of the small pressure differential exerted on an average on this partition. Due to the rigidity of the seal base, this constructional form requires that the seal move stepwise when crossing an elemental irregularity on the track, which permits of interconnecting the seals of pairs of cushions that operate consecutively in the direction of travel of the vehicle. It would likewise be possible to interconnect two separately constructed seals mechanically and, if need be, elastically. The middle portion of the seal 3g and of the base plate supporting the same has been cut away in the drawing in order to reveal a flexible partition 6g used for the space within the seal.

While there has been shown and described, the presently preferred embodiments of the seal for air cushion vehicles of the invention, it will be well understood by those skilled in the art that various changes and modifications may be made in these embodiments. More particularly, it would be possible to replace the links 5 for guiding the base plates 4 by elastic blades fixed to the vehicle wall and to dispense with the springs inside the seal.

What is claimed is:

1. A pressure fluid cushion sealing system for a tracked ground effect machine having a main body movable in spaced relationship along a bearing track surface with a pressure fluid cushion being formed therebetween, said sealing system comprising a substantially rigid base plate extending peripherally with respect to said cushion and in a plane generally parallel to and adjacent said surface, at least one seal lip fast with said base plate and projecting toward said surface, said lip ending with a free edge which, in normal operation, is at a small distance from said surface and defines therewith a cushion fluid leakage gap, and a flexible membrane fluidtightly connecting the plate-and-lip assembly to said body for laterally bounding said pressure fluid cushion, wherein the improvement comprises a support structure for fitting said plate-and-lip assembly to said machine body, comprising linking guide means extending between said body and said assembly and allowing substantially free movement of said assembly relatively to said body, perpendicularly to said surface, while restraining movement of said assembly relatively to said body, parallel to said surface, and resilient return means extending between said body and said assembly for urging said assembly toward said surface.

2. Sealing system as claimed in claim 1, wherein said linking guide means comprise tie members stretching out from said body in directions which are near parallel to said track surface.

3. Sealing system as claimed in claim 2 wherein said tie members radiate from a central zone of said body to generally opposite points of said assembly.

4. Sealing system as claimed in claim 2, wherein tie members linked to generally opposite points of said assembly cross each other along their stretch to said body.

5. Sealing system as claimed in claim 1, wherein said linking guide means comprise a plurality of articulated arms hinged at one end thereof to said body and at the other end thereof to said assembly, the distance between the hinged ends of each arm measured perpendicularly to said track surface being a minor fraction of said distance measured parallel to said track surface.

6. Sealing system as claimed in claim 1, wherein said base plate is in the general —shape of a rectangle and said linking guide means comprise tie members which are movable and extend substantially in the planes of symmetry passing through the midpoints of the sides of said rectangle and perpendicular to said surface.

7. Sealing system as claimed in claim 6, wherein the length of each tie member measured between the connections thereof to said body and to said assembly, respectively, is at least equal to substantially half the distance between the midpoints of opposite sides of said rectangle.

8. Sealing system as claimed in claim 7, wherein the tie members extending in the plane of symmetry of the rectangle passing through the midpoints of the longer sides thereof have a length substantially greater than half the distance between said midpoints and said tie members cross each other.

9. Sealing system as claimed in claim 8, wherein the tie members in every plane of symmetry of the rectangle have substantially the same length.

10. Sealing system as claimed in claim 1, wherein said flexible membrane is double-walled and bounds a pneumatic chamber formed on the side of said base plate remote from said track surface, said pneumatic chamber hindering movement of said base plate away from said track surface.

11. Sealing system as claimed in claim 10, wherein said resilient return means comprise springs housed within said pneumatic chamber.

12. Sealing system as claimed in claim 11, wherein said pneumatic chamber is vented through a restricted orifice to operate as a dash-pot damper.

13. Sealing system as claimed in claim 10, comprising further means for pressurizing said pneumatic chamber.

14. Sealing system as claimed in claim 10, wherein said double-walled flexible membrane, said base plate and said lip form a unitary, resiliently deformable member.

15. Sealing system as claimed in claim 14, wherein said base plate comprises embedded reinforcements for stiffening said base plate.

References Cited

UNITED STATES PATENTS

| | | | |
|---|---|---|---|
| 3,116,897 | 1/1964 | Theed. | |
| 3,172,494 | 3/1965 | Cockerell | 180—7 |
| 3,185,240 | 5/1965 | Eggington et al. | 180—7 |
| 3,190,235 | 6/1965 | Bertin et al. | 104—134 |
| 3,232,366 | 2/1966 | Cockerell | 180—7 |
| 3,273,663 | 9/1966 | Cockerell | 180—7 |

A. HARRY LEVY, *Primary Examiner.*

UNITED STATES PATENT OFFICE
CERTIFICATE OF CORRECTION

Patent No. 3,385,390　　　　　　　　　　　　　　　May 28, 1968

Paul François Guienne

It is certified that error appears in the above identified patent and that said Letters Patent are hereby corrected as shown below:

In the heading to the printed specification, lines 4 and 5, "assignor to Societe Bertin & Cie, Paris, France, a company of France" should read -- assignor, by mesne assignments, to Societe D'Etudes De L'Aerotrain, Plaisir (Seine et Oise), France, a corporation of France --.

Signed and sealed this 17th day of February 1970.

(SEAL)
Attest:

Edward M. Fletcher, Jr.　　　　　　　　　　　　WILLIAM E. SCHUYLER, JR.
Attesting Officer　　　　　　　　　　　　　　　　Commissioner of Patents